United States Patent [19]

Peters et al.

[11] 4,315,190

[45] Feb. 9, 1982

[54] ZINC SILICATE PHOSPHOR WITH EXTENDED FLORESCENCE DECAY AND CATHODE RAY TUBE CONTAINING THE SAME

[75] Inventors: Thomas E. Peters, Chelmsford; James R. McColl, Concord, both of Mass.

[73] Assignee: GTE Laboratories Incorporated, Waltham, Mass.

[21] Appl. No.: 216,595

[22] Filed: Dec. 15, 1980

[51] Int. Cl.$^3$ ............................................. C09K 11/44
[52] U.S. Cl. ............................... 313/467; 252/301.6 F
[58] Field of Search ................. 252/301.6 F; 313/467

[56] References Cited

U.S. PATENT DOCUMENTS

| | | | |
|---|---|---|---|
| 2,176,099 | 10/1939 | Pfanstiehl | 252/301.6 F |
| 2,205,815 | 6/1940 | Foulke | 252/301.6 F |
| 2,206,280 | 7/1940 | Froelich | 252/301.6 F |
| 2,238,026 | 4/1941 | Moore | 252/301.6 F |
| 2,247,192 | 6/1941 | Fonda | 252/301.6 F |
| 2,252,500 | 8/1941 | Fonda | 252/301.6 F |
| 2,554,999 | 5/1951 | Merrill et al. | 252/301.6 F |
| 3,416,019 | 12/1968 | Kaduk | 252/301.6 F X |
| 3,568,635 | 6/1971 | Vanik et al. | 252/301.6 F |
| 3,644,212 | 2/1972 | McAllister et al. | 252/301.6 F |

FOREIGN PATENT DOCUMENTS 620835  3/1949  United Kingdom ......... 252/301.6 F

OTHER PUBLICATIONS

Froelich et al., "J. Phys. Chem.", 46, 878-885, (1942).
Gashurov et al., "J. Electrochem. Soc.: Solid State Science", 114, 378-381, (1967).
Wilke, "Zeitschrift Für Physikalische Chemie", 224: 51-56, (1963).

*Primary Examiner*—Jack Cooper
*Attorney, Agent, or Firm*—Jerry F. Janssen

[57] ABSTRACT

A white bodied green-emitting phosphor having improved persistence and brightness comprises manganese activated zinc silicate incorporating arsenic and an alkali metal wherein the arsenic to zinc atom ratio ranges between about 0.00005 to about 0.001 and wherein the alkali metal is present in an amount of between about 0.5 to about 2.0 times the concentration of arsenic present in the phosphor.

9 Claims, 6 Drawing Figures

ZINC SILICATE PHOSPHOR WITH EXTENDED FLORESCENCE DECAY AND CATHODE RAY TUBE CONTAINING THE SAME

BACKGROUND OF THE INVENTION

This invention relates to luminescent materials. More particularly, it is concerned with phosphors of the zinc silicate series.

Manganese activated zinc silicate is a well known green emitting cathodoluminescent phosphor identified commercially as type P-1. When manganese is incorporated into zinc silicate, the resulting material is often off-white or dark in appearance. A white bodied manganese activated zinc silicate phosphor can be produced by employing excess silica over the amount stoichiometrically required, as taught by U.S. Pat. No. 2,245,414 to Roberts, or by incorporating small amounts of magnesium into the zinc orthosilicate lattice as disclosed in U.S. Pat. No. 3,416,019 to Kaduk.

The P-1 phosphors, however, are generally characterized by rapid fluorescence decay and can exhibit the visual effect of undesirable flicker when used in such applications as cathode ray display tubes operated at low referesh rates. To improve the persistance of manganese activated zinc silicate phosphors, small amounts of arsenic are added as taught by U.S. Pat. No. 2,554,999 to Merrill et al. Arsenic-containing manganese activated zinc phosphors are identified commercially as type P-39.

While persistance in type P-39 phosphors generally increases with increasing arsenic content, it does so at the expense of brightness. Often, small changes in arsenic content will produce appreciable changes in phosphor brightness. Thus, in producing these phosphors, an attempt is made to effect a compromise between improved persistance on the one hand and diminished brightness on the other. Rigorous control of the arsenic concentration in the silicate phosphors is often difficult owing to the tendency of arsenic compounds to volatilize from the formulation during the repeated high temperature firings often required for the formation of zinc silicate phosphors.

To facilitate the formation of zinc silicate phosphors, it has been the practice to employ alkali metal or alkaline earth metal salts as fluxes during firing steps as taught by U.S. Pat. No. 2,247,192 to Fonda. The use of such fluxes is not desirable, however, in producing arsenic-containing zinc silicate phosphors since fluxes such as lithium chloride can completely quench the beneficial effect of extended fluorescence decay produced by arsenic in such phosphors [see for example Froelich and Fonda in *J. Phys. Chem.*, 46:878–885 (1942)].

It is believed therefore that an arsenic-containing manganese activated zinc silicate phosphor having improved persistence and brightness would be an advancement in the art.

OBJECTS AND SUMMARY OF THE INVENTION

It is an object of the invention to provide an improved arsenic-containing manganese activated zinc silicate phosphor.

It is a further object of the invention to provide an improved arsenic-containing manganese activated zinc silicate phosphor having enhanced fluorescence persistence while minimizing or eliminating brightness losses generally associated with the incorporation of arsenic in such phosphors.

It is another object of the invention to provide an improved arsenic-containing manganese activated zinc silicate phosphor having superior persistence at higher drive levels than prior art type P-39 phosphors.

It is a still further object of the present invention to provide a cathodoluminescent screen having lower visual flicker.

These and still further objects are achieved in one aspect of the invention by a green emitting white bodied manganese activated zinc silicate phosphor having both arsenic and an alkali metal incorporated therein, where the arsenic to zinc atom ratio is between about 0.00005 to about 0.001 and where the amount of alkali metal present in the phosphor is between about 0.5 to about 2.0 times the amount of arsenic.

BRIEF DESCRIPTION OF THE DRAWING

In the drawing:

FIG. 4a and FIG. 4b are graphs showing, respectively, the brightness of a pulse-excited phosphor in accordance with one aspect of the invention, and the fundamental sine term of a Fourier analysis of the periodic waveform of FIG. 4a.

For a better understanding of the present invention, together with other and further objects, advantages and capabilities thereof, reference is made to the following disclosure and appended claims in connection with the above-described drawings.

DETAILS OF THE PREFERRED EMBODIMENTS

Phosphors in accordance with the present invention comprise manganese activated zinc orthosilicate containing small amounts of both arsenic and an alkali metal. These phosphors exhibit enhanced persistence and brightness over prior art phosphors which contain no alkali metal or, alternatively contain relatively large amounts of alkali metal salts added as fluxes to aid in the formation of the phosphor.

Figure 1:
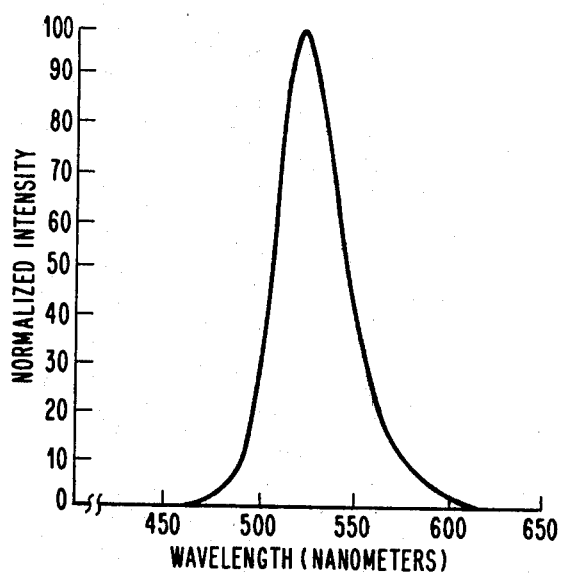
FIG. 1 is the emission spectrum of phosphors in accordance with the present invention.

The phosphors of this invention are white-bodied, green-emitting cathodoluminescent phosphors having an emission band peaking at 523 nm as shown by the normalized emission curve given in FIG. 1. The phosphors are non-stoichiometric compositions which can be conveniently expressed by the general formula:

$$2\,ZnO.v\,SiO_2.w\,MgO.x\,MnO.y\,As_2O_5.z\,M_2O$$

where M represents an alkali metal and the coefficients in the above formula range between:

$1.0 \leq v \leq 2.0$ $0.01 \leq w \leq 0.1$ $$0.001 \leq x \leq 0.01$$

$$0.00005 \leq y \leq 0.001$$

$$0.5y \leq z \leq 2.0y.$$

The preferred alkali metals are lithium, sodium, and potassium, with lithium being the most preferred.

The phosphors of this invention exhibit enhanced fluorescence persistence over prior art arsenic-containing manganese activated zinc silicate phosphors as well as improved brightness. It has been previously thought that inclusion of alkali metals in such phosphors resulted in diminishing or eliminating the beneficial effect upon fluorescence persistence normally associated with arsenic inclusion. It has been found, however, in accordance with the present invention, that the inclusion of small amounts of an alkali metal in arsenic-containing manganese activated zinc silicate enhances brightness and persistence. However, if the amount of alkali metal present in the phosphor exceeds more than about twice the concentration of arsenic, the previously noted deleterious effect is seen. Preferred concentration ranges for inclusion of alkali metals in phosphors of this invention range between about 0.5 to about 2.0 times the arsenic content, with the arsenic to zinc atom ratio in turn being between about 0.00005 to about 0.001. In a preferred embodiment of the invention, the arsenic and alkali metal are present in the phosphor in substantially equal atom amounts.

Figure 2:
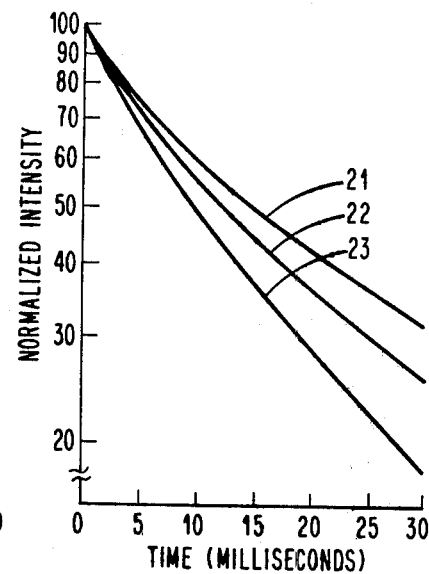
FIG. 2 is a graph of fluorescence decay curves for a phosphor in accordance with one aspect of the present invention compared with those of prior art phosphors.

The enhanced persistence of phosphors of this invention is illustrated by examination of the fluorescence decay curves presented in FIG. 2. In FIG. 2, curve 22 represents the fluorescence decay curve for a prior art type P-39 arsenic-containing manganese activated zinc silicate phosphor. The curve 21 represents the fluorescence decay curve for a phosphor in accordance with the present invention containing small amounts of both arsenic and an alkali metal, prepared as detailed in Example I below. Curve 23 represents the fluorescence decay curve for an arsenic-containing manganese activated zinc silicate phosphor containing higher levels of an alkali metal; this phosphor represents the type of material which normally results from the use of an alkali metal as a flux during phosphor preparation. The phosphor for curve 23 was prepared in accordance with Example VIII, detailed below.

As can be seen by the decay curves for the three phosphor samples, which curves have been normalized for direct comparison, the inclusion of small amounts of an alkali metal in arsenic-containing manganese activated zinc silicate phosphors in accordance with the present invention results in materials with significantly increased persistence. This property is desirable in phosphor applications where diminished flicker is important or where increased persistence is required such as in data display CRT tubes or radar display tubes. Moreover, the inclusion of small amounts of an alkali metal together with the arsenic in such phosphors results in the improved persistence without the diminished brightness normally associated with the incorporation of arsenic. In Table 1, the brightness and persistence of several representative phosphors in accordance with the present invention are presented together with data for a phosphor containing higher levels of an alkali metal for purposes of comparison.

The brightness and persistence data presented in Table 1 were obtained by coating each phosphor sample on a plaque and pulse exciting the sample by irradiation with an electron beam operated at 30 Hz with a dwell time of 0.5 microseconds. The brightness of each sample was normalized by adjusting the electron beam current so that the commercial sample of type P-39 phosphor had a measured luminance of 20 foot-lamberts under the experimental conditions; each sample brightness was then measured using this electron beam current. A spot photometer measured the brightness 100 micron region of the excited phosphor plaque.

Figure 4A:
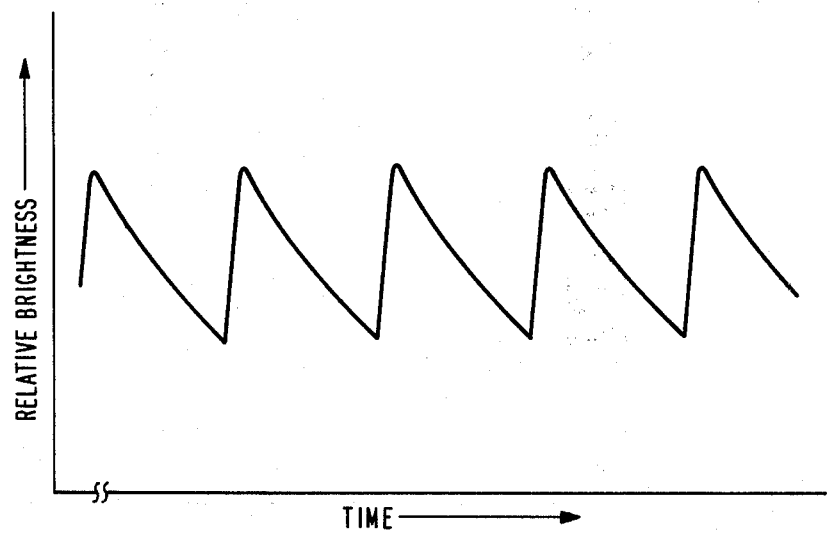
Figure 4B:
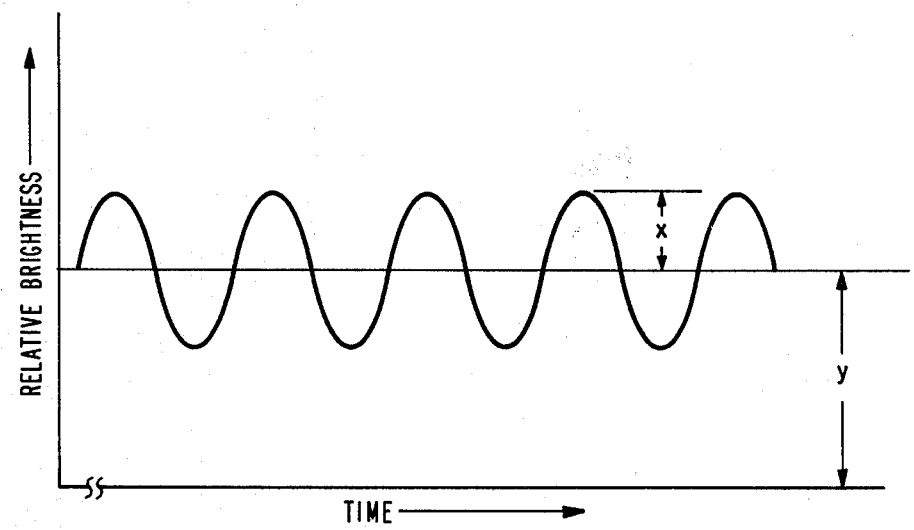

The persistence data of Table 1 are presented in terms of a "ripple ratio" determined by a method which can best be seen by reference to FIGS. 4a and 4b. FIG. 4a represents a schematic presentation of a cyclical excitation-decay curve for a pulse excited phosphor. FIG. 4b represents a sinusoidal waveform derived by Fourier analysis of the waveform of FIG. 4a ignoring all higher frequency harmonic terms above the fundamental. The ripple ratio for the phosphors presented in Table 1 is the ratio of the variation in brightness, x (of FIG. 4b) to the average brightness, y (of FIG. 4b). This measure of persistence was chosen because it is felt to best represent the effect of fluorescence decay upon the visual perception of flicker in phosphor applications such as data display tubes operated at low refresh rates.

TABLE 1

| Phosphor Sample | Relative Brightness | Persistence (Ripple Ratio) |
| --- | --- | --- |
| Standard Commercial Type P-39 | 100 | 0.370 |
| I | 128 | 0.340 |
| II | 108 | 0.358 |
| III | 132 | 0.337 |
| IV | 101 | 0.295 |
| V | 98 | 0.302 |
| VI | 106 | 0.312 |
| VII | 96 | 0.315 |
| VIII* | 145 | 0.576 |

*Sample VIII contained excess lithium salt added as a flux during phosphor preparation As can be seen by the data of Table 1, the phosphor samples in accordance with the present invention, Examples II–VII, demonstrated increased persistence over both the prior art commercial type P-39 phosphor and the arsenic-containing manganese activated zinc silicate which contained flux levels of an alkali metal. The brightness of the latter phosphor sample was considerably above that of the commercial sample, but the persistence was considerably less as indicated by the higher ripple ratio. This illustrates the trade-off which usually results from the inclusion of arsenic in manganese activated zinc silicate phosphors. However, the data of Examples II through VII show that incorporation of both arsenic and an alkali metal in manganese activated zinc silicate phosphors in accordance with the invention results in phosphors which have enhanced persistence over prior art phosphors while exhibiting equivalent or improved brightness.

It is believed that incorporation of an alkali metal in concentrations ranging from about 0.5 to 2.0 times the amount of arsenic present in manganese activated zinc silicate phosphors permits the enhanced persistence effect of the arsenic to be realized while simultaneously eliminating or diminishing the detrimental effect of decreased brightness that such arsenic incorporation usually causes.

Figure 3:
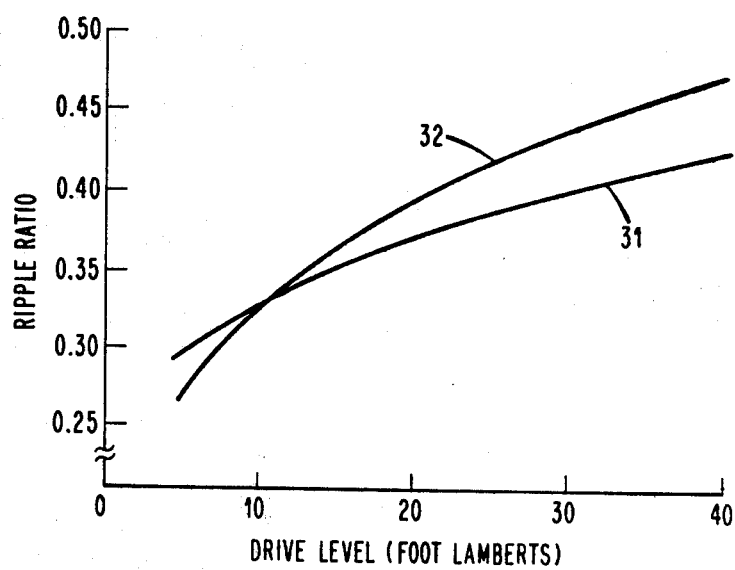
FIG. 3 is a graph showing the effect of phosphor cathodoluminescent drive level upon flicker for a phosphor in accordance with one aspect of the present invention compared with prior art phosphors.

Another advantage of phosphors of the present invention is illustrated by the data presented in FIG. 3 where the persistence of several phosphors is plotted as a function of the drive level for emission. Curve 32 represents the ripple ratio for a prior art type P-39 phosphor driven at several brightness levels. Curve 31 represents a similar curve for a phosphor in accordance with the present invention which includes both arsenic and lithium at low levels. As can be seen by reference to FIG. 3, phosphors of the present invention can be driven at higher drive levels than prior art phosphors without exhibiting as much visual perception of flicker. This is a desirable property when such phosphors are included in data display tubes.

Figure 5:
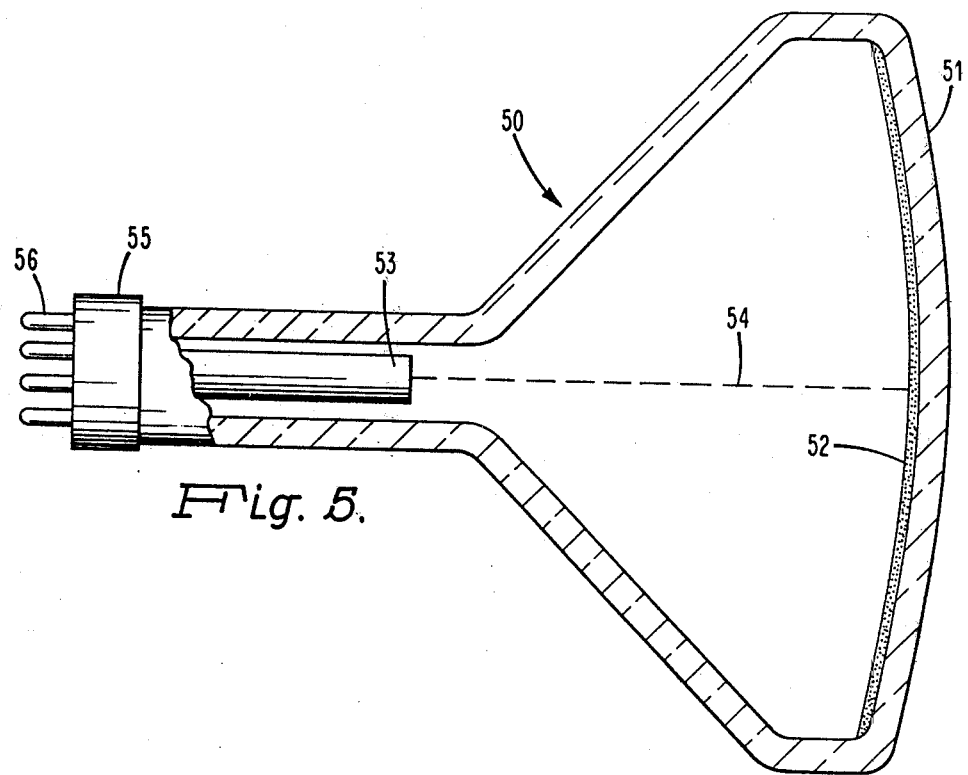
FIG. 5 is a cut-away cross section of a cathode ray tube employing a cathodoluminescent screen comprising phosphors in accordance with the present invention.

A phosphor screen in accordance with another aspect of the invention is shown in FIG. 5 where there is shown in schematic cut-away cross section a cathode ray tube 50. A screen of phosphor 52 is applied to the inside surface of the tube face panel 51. The phosphor screen is excited by electron beam 54 which is produced by gun assembly 53. The tube 50 is sealed by means of cap 55 having electrical connections 56 for attaching the tube to an electrical circuit.

In accordance with this embodiment of the invention, the screen comprises a layer of a white-bodied, green-emitting manganese activated zinc silicate phosphor including arsenic and an alkali metal, with the arsenic to zinc atom ratio between about 0.00005 to about 0.001 and with the alkali metal present in an amount of from about 0.5 to about 2.0 times the arsenic concentration in the phosphor. In preferred embodiments, the screen comprises a phosphor having the composition given by the general formula:

2 ZnO.v SiO$_2$.w MgO.x MnO.y As$_2$O$_5$.z M$_2$O where M is an alkali metal, preferably lithium, and the values of the coefficients in the general formula range between:

$1.0 \leq v \leq 2.0$ $0.01 \leq w \leq 0.1$ $0.001 \leq x \leq 0.01$ $0.00005 \leq y \leq 0.001$ $0.5y \leq z \leq 2.0y$.

In a most preferred embodiment of the invention, the phosphor screen comprises a phosphor having the composition given by the general formula above where y is substantially equal to z.

In order to enable one skilled in the art to practice the invention, the following examples are given. These examples are to be viewed as illustrative of the invention and are not to be viewed as limiting the scope of the invention.

EXAMPLE I

Zinc oxide (162.76 g, 2.0 mole), silicic acid (103.08 g, 1.32 mole), magnesium fluoride (2.49 g, 0.04 mole), manganese carbonate (0.40 g, 0.0035 mole), arsenic pentoxide (0.03 g, 0.00035 mole), and lithium nitrate (0.048 g, 0.0007 mole) were dry blended and then milled to achieve a uniform, finely divided mixture. A 15 g aliquot was fired in a covered quartz crucible for about 4 hours at 870° C. After which the cooled phosphor cake was crushed and milled with 1.5 g (10% by weight of the phosphor blend) of ammonium chloride. The resulting mixture was refired for about 4 hours at 1232° C. in a covered quartz crucible. The phosphor cake was crushed and milled to obtain a finely divided product.

EXAMPLE II

A sample of phosphor was prepared in accordance with the method of Example I, but substituting 0.059 g (0.0007 mole) of sodium nitrate for the lithium nitrate of Example I.

EXAMPLES III–VII

Examples III–VII were prepared in accordance with the method of Example I, but contained varying amounts of arsenic and lithium. The composition of these phosphor samples is presented in Table 2.

EXAMPLE VIII

This phosphor example was prepared to illustrate the effect of flux levels of lithium salts on the persistence and brightness of manganese activated zinc silicate phosphors.

Zinc oxide (146.18 g, 1.80 mole), silicic acid (70.28 g, 0.9 mole), MnSO$_4$.H$_2$O (0.59 g, 0.0035 mole), arsenic trioxide (0.69 g, 0.00035 mole), and lithium fluoride (5.19 g, 0.2 mole) were treated as detailed by the method of Example I.

TABLE 2

| Example | Moles ZnO | Moles SiO$_2$* | Moles MgO** | Moles MnO*** | Moles As$_2$O$_5$ | Moles Li$_2$O**** | Atom Ratio As/Zn | Atom Ratio Li/As |
|---|---|---|---|---|---|---|---|---|
| III | 2.0 | 1.32 | 0.04 | 0.0035 | 0.00035 | 0.00035 | 0.00035 | 1.00 |
| IV | 2.0 | 1.32 | 0.04 | 0.0035 | 0.00040 | 0.00035 | 0.00040 | 1.14 |
| V | 2.0 | 1.32 | 0.04 | 0.0035 | 0.00050 | 0.00035 | 0.00050 | 1.43 |
| VI | 2.0 | 1.32 | 0.04 | 0.0035 | 0.00040 | 0.00040 | 0.00040 | 1.00 |
| VII | 2.0 | 1.32 | 0.04 | 0.0035 | 0.00050 | 0.00050 | 0.00050 | 1.00 |

*Added to the unfired phosphor blend as silicic acid.
**Added to the unfired phosphor blend as magnesium fluoride.
***Added to the unfired phosphor blend as manganese carbonate.
****Added to the unfired phosphor blend as lithium nitrate.

While there have been shown and described what are at present believed to be the preferred embodiments of the invention, it will be obvious to those skilled in the art that various changes and modifications may be made therein without departing from the scope of the invention as defined by the appended claims.

What is claimed is:

1. A green-emitting white-bodied cathodoluminescent manganese activated zinc silicate phosphor having a composition corresponding to the general formula:

2 ZnO.v SiO$_2$.w MgO.x MnO.y As$_2$O$_5$.z M$_2$O wherein M is an alkali metal and:

$1.0 \leq v \leq 2.0$ $0.01 \leq w \leq 0.1$ $0.001 \leq x \leq 0.01$ $0.00005 \leq y \leq 0.001$ $0.5y \leq z \leq 2.0y$.

2. A phosphor in accordance with claim 1 wherein said alkali metal is selected from the group consisting of lithium, sodium, and potassium.

3. A phosphor in accordance with claim 1 wherein said alkali metal is lithium.

4. A phosphor in accordance with claim 1 wherein z is substantially equal to y.

5. A phosphor in accordance with claim 4 wherein said alkali metal is lithium.

6. A cathode ray tube comprising a green-emitting white-bodied manganese activated zinc silicate phosphor having a composition corresponding to the general formula:

$2ZnO.vSiO_2.wMgO.xMnO.yAs_2O_5.zM_2O$ wherein M is an alkali metal and:

$1.0 \leq v \leq 2.0$ $0.01 \leq w \leq 0.1$ $0.001 \leq x \leq 0.01$ $0.00005 \leq y \leq 0.001$ $0.5y \leq z \leq 2.0y$.

7. A cathode ray tube in accordance with claim 6 wherein the alkali metal contained in said phosphor is selected from the group consisting of lithium, sodium, and potassium.

8. A cathode ray tube in accordance with claim 6 wherein the alkali metal contained in said phosphor is lithium.

9. A cathode ray tube in accordance with claim 8 wherein z is substantially equal to y.

* * * * *